Figure 1:
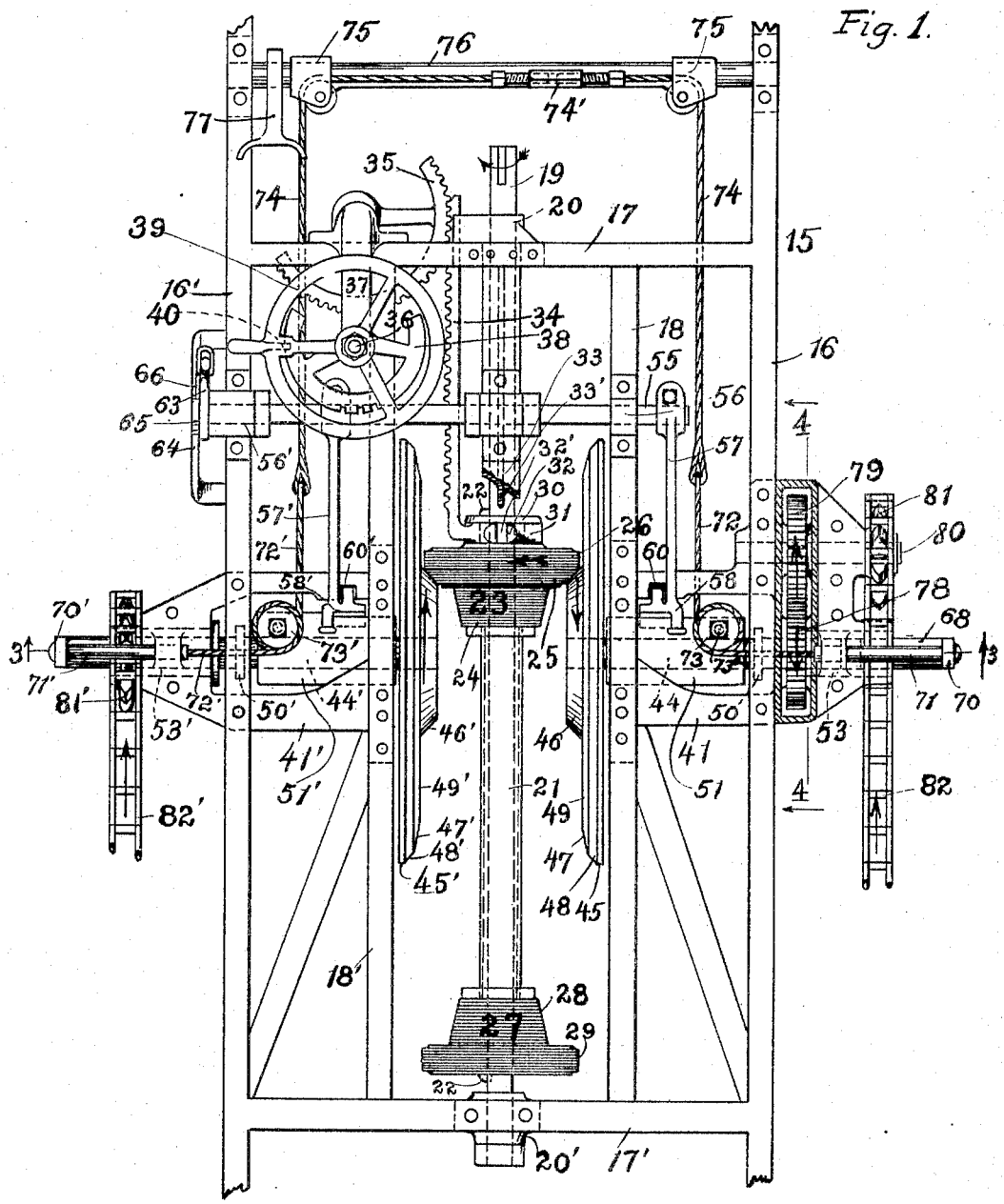

No. 777,343. PATENTED DEC. 13, 1904.
W. F. HOWE.
VARIABLE SPEED POWER TRANSMISSION DEVICE.
APPLICATION FILED NOV. 16, 1903.
NO MODEL. 5 SHEETS—SHEET 1.

WITNESSES
H. G. Underwood
M. F. Allen

INVENTOR
William F. Howe
By Foree Bain
Atty.

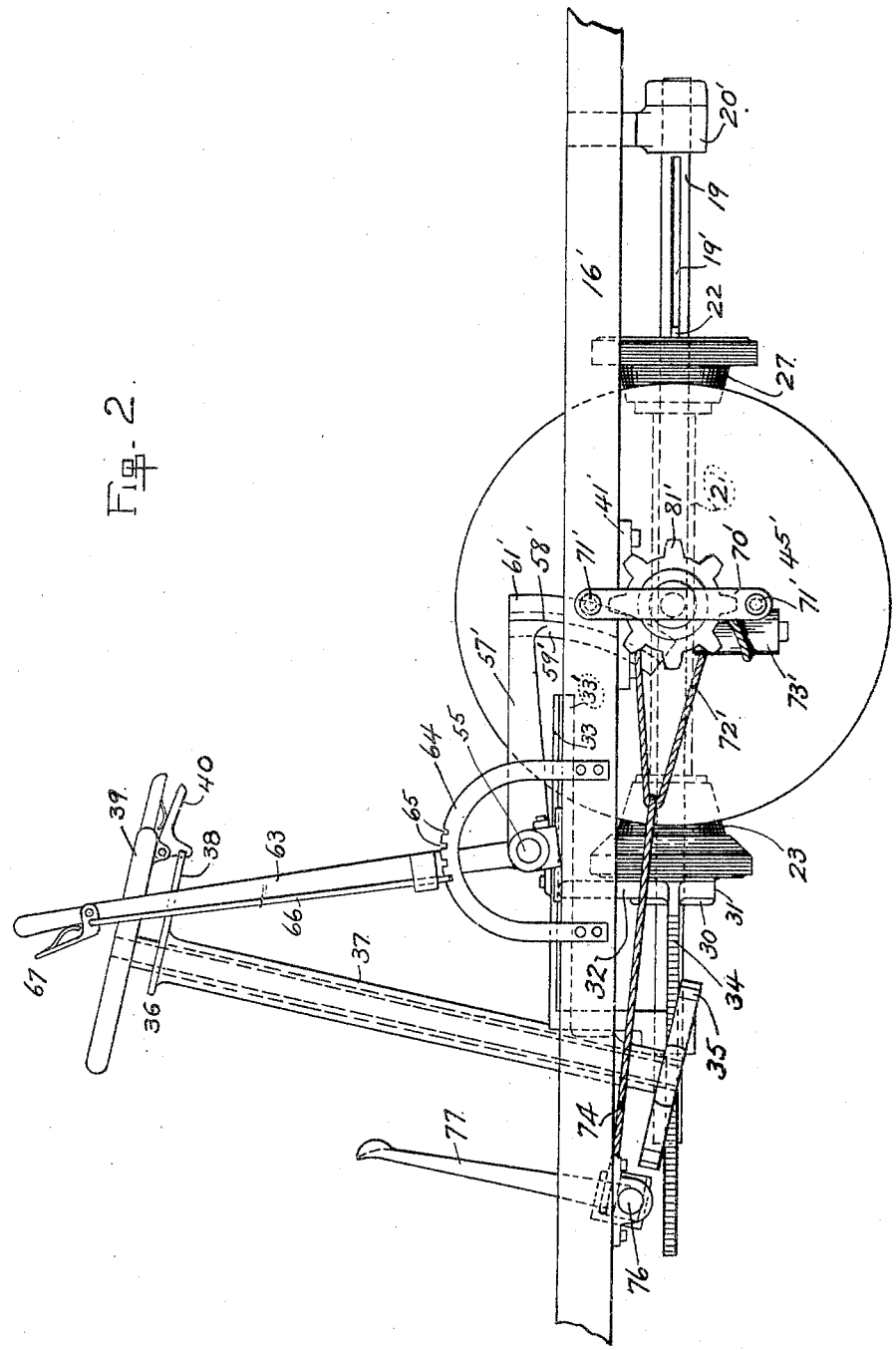

No. 777,343. PATENTED DEC. 13, 1904.
W. F. HOWE.
VARIABLE SPEED POWER TRANSMISSION DEVICE.
APPLICATION FILED NOV. 16, 1903.
NO MODEL. 5 SHEETS—SHEET 3.
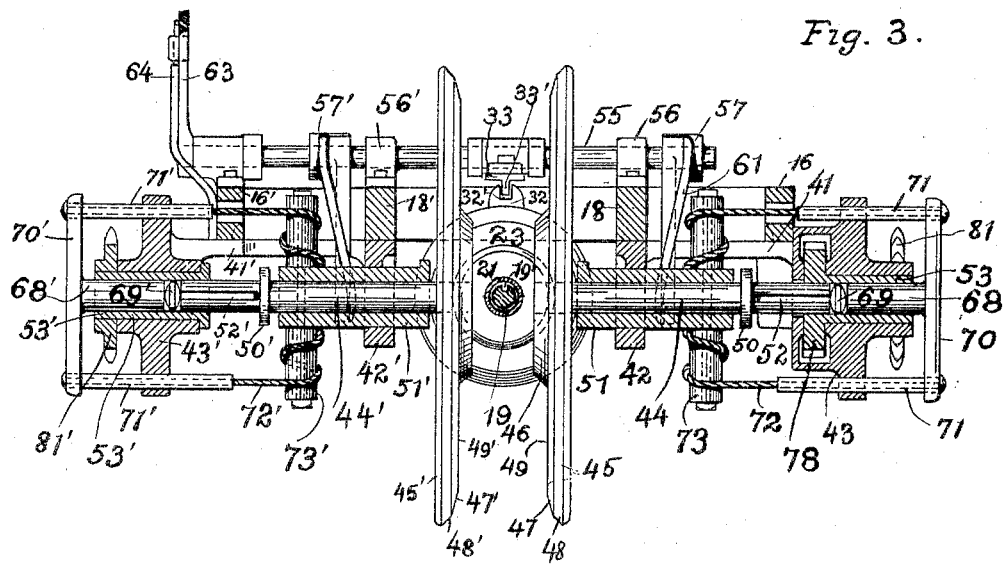
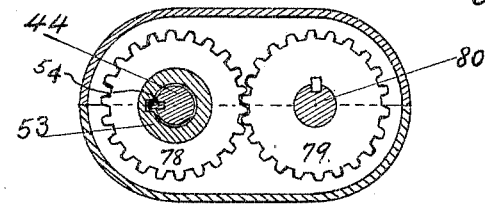
WITNESSES:
INVENTOR.
William F. Howe
BY
ATTORNEY.

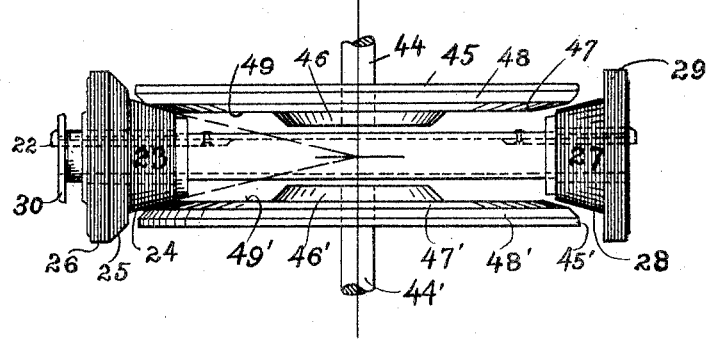
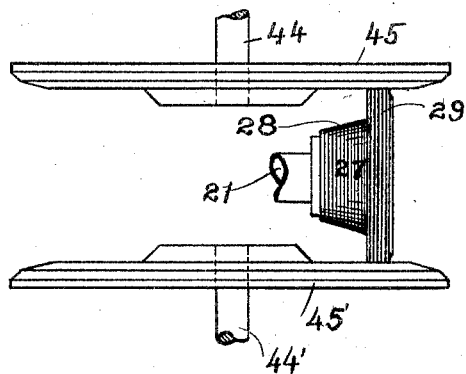
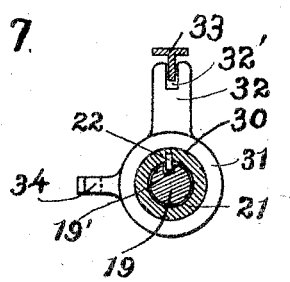

No. 777,343. PATENTED DEC. 13, 1904.
W. F. HOWE.
VARIABLE SPEED POWER TRANSMISSION DEVICE.
APPLICATION FILED NOV. 16, 1903.
NO MODEL. 5 SHEETS—SHEET 5.
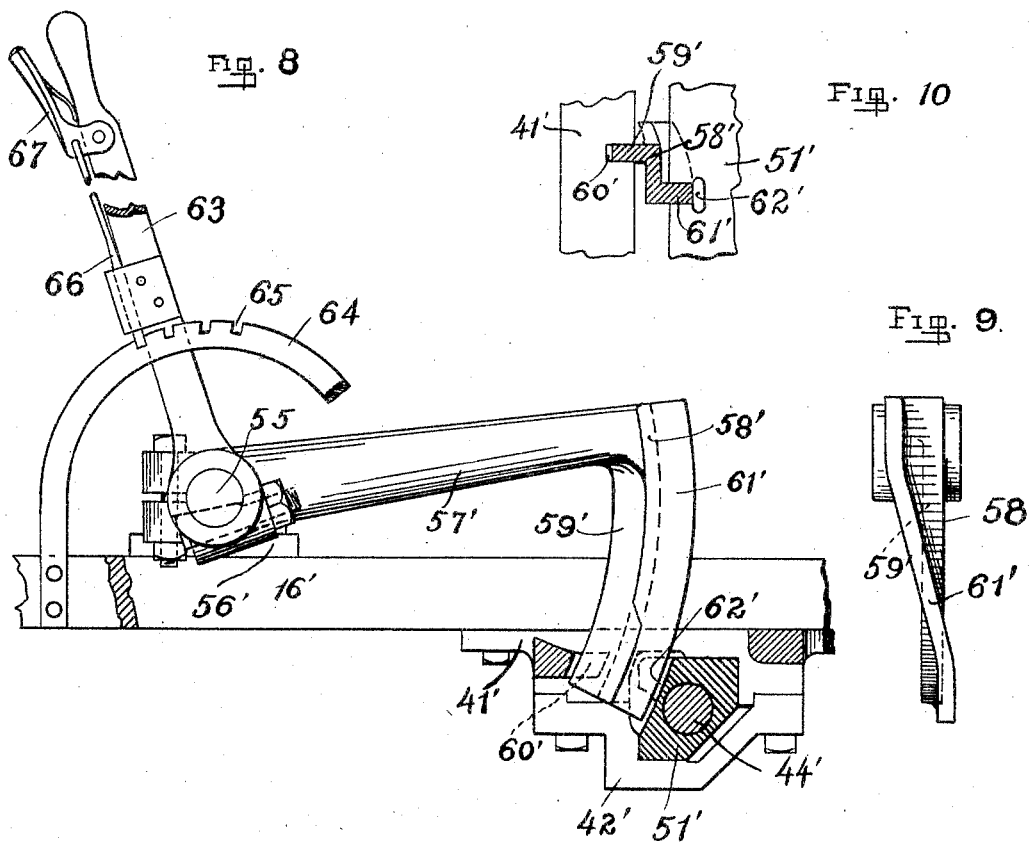
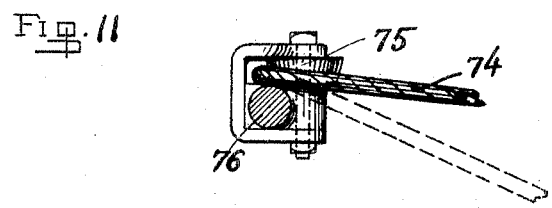
WITNESSES: INVENTOR.
William F. Howe
By Foree Bain
Atty.

No. 777,343.

Patented December 13, 1904.

UNITED STATES PATENT OFFICE.

WILLIAM F. HOWE, OF CHICAGO, ILLINOIS.

VARIABLE-SPEED POWER-TRANSMISSION DEVICE.

SPECIFICATION forming part of Letters Patent No. 777,343, dated December 13, 1904.

Application filed November 16, 1903. Serial No. 181,335. (No model.)

*To all whom it may concern:*

Be it known that I, WILLIAM F. HOWE, of Chicago, in the county of Cook and State of Illinois, have invented certain new and useful Improvements in Variable-Speed Power-Transmitting Devices; and I hereby declare that the following is a full, clear, and exact description thereof, reference being had to the accompanying drawings, which form part of this specification.

My invention relates to variable-speed power-transmission devices, and more particularly to that class of transmission devices wherein the coacting gear members are friction-disks, one of which is arranged to be moved lengthwise of its axis to radially traverse the face of the other and wherein the disks are relatively movable to cause the first said disk to make peripheral contact with the face of the other. Devices of this type are advantageous for many purposes in that they permit of an infinite variety of adjustments within certain limits to secure corresponding speed adjustments of the driven element; but as heretofore constructed they are open to the objection that the line of actual contact between the working surfaces of the two friction gear members is in no position the true or theoretically-correct line of contact which should be established to attain the highest efficiency of transmission. Such true line of contact, as is well known in mechanical practice, if extended includes the theoretical point of intersection of the shaft-axes, each gear member being beveled, so that its working surface forms the frustum of a cone whose apex coincides with the said point of intersection of the shaft-axes. When the gears are so constructed, it is obvious that the surface speeds of all zones of one gear bear the same relation to the speeds of the coacting zones of the complementary gear, so that no relative slippage takes place between the members.

One object of my invention is to provide a frictional power-transmission gear susceptible of adjustment to transmit from the driving-shaft to the driven shaft any desired relative speed within the limits of the gear and wherein the friction gear members are so constructed and arranged that when in positions appropriate to certain predetermined relative speeds of the driving and driven shafts the contact of their working surfaces will be made in the true or theoretically-correct lines of contact for such positions.

A further object of my invention is to provide improved devices for varying the relative positions of the gear members and positioning them for operative coaction.

A further object of my invention is to improve the construction and arrangement of devices of the character described.

With a view to attaining these and other objects, which will be apparent to those skilled in the art from the following description, my invention consists in the features of construction and arrangements of parts hereinafter more fully described, and specified in the claims.

In the drawings I have illustrated my invention as embodied in a device particularly applicable to automobiles or motor-vehicles, and I shall hereinafter describe the same with reference to such use, although I desire it to be understood that I do not limit myself to the use of my invention in such connection, as it is obviously susceptible of wide application.

In said drawings, Figure 1 is a top plan view of a power-transmission device embodying my invention as adapted for automobile use. Fig. 2 is a side elevation of the same. Fig. 3 is a transverse vertical section on line 3 3 of Fig. 1. Fig. 4 is a section on line 4 4 of Fig. 1. Fig. 5 is a detail representing one operating condition of the friction gearing. Fig. 6 is a detail illustrating another operating condition of the gearing. Fig. 7 is a detail section of the shifting collar for the driving-gear and the guide therefor. Fig. 8 is an enlarged detail of the hand-lever mechanism for axially shifting the driven gears. Fig. 9 is a detail of the cam forming part of said lever mechanism. Fig. 10 is a transverse section of the cam and its adjacent parts. Fig. 11 is a detail of a pulley arrangement.

In the drawings, 15 represents generally a rectangular supporting-framework formed of side pieces 16 and 16' and end pieces 17 and 17', within which are arranged additional frame members 18 and 18', arranged parallel with and at a suitable distance from the side pieces 16 and 16', respectively, and supported on the end pieces 17 and 17'.

19 indicates the shaft adapted to receive power from the engine or other prime motor, preferably disposed centrally of the machine and extending longitudinally thereof. This shaft 19 I will hereinafter designate the "driving-shaft."

20 and 20' indicate bearings for the driving-shaft 19, secured to the frame-pieces 17 and 17', respectively.

21 is an elongated sleeve slidably mounted on the shaft 19 and rotatable therewith through the engagement of a feather 22 of said sleeve with the longitudinal groove 19' of the shaft.

23 and 27 indicate, respectively, front and back driving gear members, which will be more fully described hereinafter, suitably spaced apart and carried in confronting relation by the sleeve 21. The sleeve 21 preferably projects somewhat beyond the forward drive-wheel 23 and is provided with a flange 30.

31 indicates a collar rotatable on the sleeve 21, intermediate the flange 30 and the gear member 23. Said collar is maintained against bodily rotation by the engagement of a slot 32' of a vertical projection 32 therefrom, with the depending flange 33' of a T-iron guide 33 extending longitudinally of the frame 15 in parallelism to the shaft 19.

34 indicates a rack-bar rigidly connected to the collar 31 and extending forward in parallelism to shaft 19.

35 indicates a gear-segment engaging said rack-bar and adapted for rotation through its operative arc by means of mechanism extending to a suitable point above the frame 15. Such mechanism is herein illustrated as an upright shaft 36, to which the segment is connected, extending through a post 37, provided at its upper end with a peripherally-notched extension-plate 38, said shaft 36 being provided at is upper end with an operating-wheel 39, carrying a latch device 40, adapted to engage with the notches of the plate 38. Other means, however, may obviously be employed to effect the oscillation of the segmental gear 35.

41 and 41' indicate frame members of suitable design secured, respectively, to the frame-pieces 16 and 18 and 16' and 18' and adapted to afford support to instrumentalities to be described. These frame members 41 and 41' are generally similar in their purpose and construction, although in specific design they are somewhat dissimilar, owing to slight differences of the mechanism to be accommodated, as will be hereinafter pointed out. I will therefore describe only the member 41, it being understood that like construction is found in the member 41', like parts being indicated by like numerals with the exponent character prime (').

42 and 43 indicate bearing projections depending from the plate 41 and apertured to afford bearings axially alining with the shaft 19 in the same plane therewith.

44 indicates a transverse shaft which I will hereinafter designate the "driven" shaft to distinguish it from the driving-shaft 19, supported with its associated parts in said bearing members 42 and 43.

45 indicates a driven gear member or disk, which will be more fully hereinafter described, carried by the inner end of the shaft 44.

50 indicates a collar secured to the shaft 44 intermediate its ends.

51 indicates an angular sleeve wherein the shaft 44 is slidably and rotatably mounted, said sleeve being disposed between the disk 45 and the collar 50 and finding sliding but non-rotatable bearing in the projection 42 of the frame-plate 41.

The portion of the shaft 44 extending outward beyond the collar 50 is provided with a groove 52 and finds bearing in a sleeve 53, mounted for rotation in the bearing projection 43 of the plate 41. The shaft 44 is connected with said sleeve 53 to rotate therewith by means of a feather 54, engaging the groove 52, but is thereby left free to slide axially with reference to the said sleeve.

The parts just described may be found duplicated in the mechanism upon the opposite side of shaft 19, like parts being there indicated by like numerals of reference differentiated by the exponent character prime (').

It will be apparent that the shafts 44 and 44' and their friction-disks may be axially moved toward and from each other by the proper movement of the sleeves 51 and 51'; but it will also be apparent that said shafts are susceptible of slight axial movement relative to said sleeves 51 and 51' irrespective of the postions of the latter.

I provide in my device means for moving each sleeve 51 to generally position its corresponding disk 45 and independent auxiliary means for effecting a movement of the corresponding shaft 44 relative to its said sleeve 51 to delicately and finally adjust said shaft and its said friction-disk with reference to said general position. The specific devices which I have illustrated for the purpose in the present embodiment are as follows:

55 indicates a rock-shaft journaled in bearings 56 and 56' above the frame. 57 57' indicate lever-arms extending rearwardly from said rock-shaft and overlying the sleeves 51 and 51', respectively. 58 indicates a segmental cam depending from the lever-arm 57. Said cam is provided with a segmental vertically-disposed guiding-blade 59, which engages a slot 60, cut into the frame member 41, and on its rear or peripheral face is provided with a cam-blade 61, angularly deflected from a vertical plane and arranged in engagement with a slot 62 in the sleeve 51. These parts are duplicated as to the mechanism for the coacting shaft 44', like parts being indicated by like numerals of reference with the exponent prime ('). These parts are best shown in Fig. 7 with reference to the mechanism for moving shaft 44'.

63 indicates a hand operating-lever secured to the rock-shaft 55 and projecting above the frame in suitable position for operation. Said lever is adapted to sweep in proximity to a segment 64, notched, as at 65, for the engagement of a latch-bolt 66, carried by the lever 63 and operable through a latch-lever in the usual manner. The notches 65 are so disposed that the engagement of the bolt 66 with them brings the driven gear mechanisms controlled by the cams 58 and 58' to such positions as they should be brought to preparatory to effecting the different frictional connections of said driven gear member with the driving gear member.

The means illustrated for effecting simultaneously the secondary movement of the shafts 44 and 44'—that is to say, their axial movement within the sleeves 51 and 51', respectively—is arranged as follows: 68 indicates a thrust-stud extending into the open exterior end of sleeve 53 and at its inner end abutting against one side of an antifriction device, preferably a double-convex step-block 69, the opposite face of which abuts against the outer end of the shaft 44. 70 indicates a vertical bar connected to the exterior end of the stud 68 and provided at its extremities with guide-pins 71, which extend through guiding-apertures in the frame projections 43. 72 indicates a cable connected at its opposite ends to the pins 71 and thence extending around a pulley member, such as a roller 73, mounted for rotation on a suitable pivot-bolt 73ᵃ, secured to the sleeve 51 for movement therewith.

The shaft 44' is provided with similar parts, (herein indicated by similar numerals primed,) and the centers of the two cables 72 and 72' are preferably connected together by a cable 74, which passes around suitable pulleys 75, mounted in eccentric relation to a rock-shaft 76, extending transversely of the frame.

77 is a foot-lever extending above the frame in a suitable position for operation and rigidly connected to the rock-shaft 76.

74' indicates a turnbuckle disposed intermediate the ends of the cable 74 and forming part of said cable connection 74. If preferred, however, the ends of the cable 74 may be directly connected to the shaft 76 without interconnection through the turnbuckle.

It will be apparent that when the lever 77 is moved forwardly to rock the shaft 76 the cable connection 74 will serve to draw the thrust-studs 68 68' into their respective sleeves, communicating pressure to the shafts 44 and 44', tending to move the same inwardly simultaneously.

It will thus be seen that I provide in my device means for effecting relative movement of the driving and driven gear members radially with respect to the driven members and axially with respect to the said driven members and that as regards the axial movement the parts may be first moved to secure an approximately proper positioning thereof through the agency of the cam mechanism and subsequently further moved to secure accurate positioning of the same by means of the auxiliary foot-lever-operated mechanism.

I will now describe the relative arrangements of the driving and driven gear members, whereby I provide for the most efficient transmission of power to produce certain predetermined speeds in the driven shaft relative to the speed of the driving-shaft. It is obvious that high speed of rotation in any driven shaft, with attending slight torque, is obtained by the engagement of a surface of the driving gear member at a relatively great radial distance from its axis of rotation with a surface of the driven gear member at a relatively short radial distance from the axis of rotation of the latter, while, conversely, slow speed and great torque are attained by the engagement of a surface of the driving gear member at a minimum distance from its axis, with the surface of the driven gear member at a maximum distance from its axis. I accordingly provide upon the driving gear member peripheral driving-surfaces at different distances from its axis of rotation, designed to coact with surfaces of the driven disk arranged at inversely-varying distances from its axis, said coacting surfaces being so disposed that the lines of contact thereof when in operation coincide with the true or theoretically-correct contact-lines of the two gear members.

In referring to the coacting surfaces of the driving and driven gear members I will herein refer to all working surfaces of the driving member as "peripheral" surfaces irrespective of the particular disposition of said surfaces, which may be at more or less oblique angles to the axis of the shaft, and I shall refer to the working surfaces of the driven disk as forming part of its side "face," though such surfaces may be more or less obliquely disposed relative to a transverse plane intersecting the axis of the driven shaft at right angles.

Referring now to the drawings, it will be noted that the driving gear member 23 is provided with a peripheral portion 24 at a relatively short distance from the axis of the shaft whereon it rotates, said surface being so inclined that its extension would form a cone which when the friction gear mechanisms are in such relation that the said surface 24 engages the corresponding surface of the driven members would present its apex at the point of intersection of the axes of shafts 19 and the shaft 44 or 44', as clearly indicated in Fig. 5. Beyond said surface 24 the driving gear member is preferably expanded considerably and is provided with a surface inclined to greater obliquity to the axis of shaft 19 and so disposed that its extension would form a cone which when said surface 25 is engaging the coacting surface of the driven disk would present its apex at the point of intersection of the shaft-axes hereto adverted to. Beyond said surface 25 the driving gear member 23 is preferably substantially truly cylindrical, its surface 26 at all points being substantially equidistant from the axis of the shaft.

The back driving gear member 27 may be so shaped as to exactly duplicate the member 23, or it may be, as herein indicated, provided only with two active surfaces, the one, 28, corresponding with the surface 24 of gear member 23 and the surface 29 corresponding exactly with the surface 26 of said gear member 23.

The confronting disks 45 and 45' are exactly alike in the configuration of their inner side faces. I will therefore describe only that of disk 45, it being understood that disk 45' is similarly shaped, like surfaces thereon being indicated by like numerals of reference, distinguished by the exponent mark prime (').

46 indicates a surface formed by deflecting the side face of the disk 45 to such an angle that when the disk 23 is properly positioned radially with reference to the driven disk said surface 46 contacts at all points in a radial line with the face 25 of the driving-disk 23. In practice I prefer, as herein illustrated, to form said surface 46 by thickening the disk 45 to present the proper surface configuration and strengthen the structure.

47 indicates an inclined surface formed near the outer periphery of the disk 45 and so arranged that when in position for contact with the face 24 of the driving gear member 23 it coöperates therewith in proper driving relation, as best illustrated in Fig. 5.

If desired, an additional surface 48 may be provided upon the disk 45 to coact with the face 25 of the driving member 23 when the latter is near its extreme movement radially of the disk 45. This latter surface may, however, be omitted, if preferred.

Intermediate the surface 46 and the surface 48 the disk is substantially flat, its annular surface 49 being arranged at substantially right angles to the axis of the shaft 44 and adapted for coaction with surface 26 of member 23.

78 indicates a spur-gear carried by the sleeve 53, surrounding shaft 44, and preferably formed integral with said sleeve.

79 indicates an intermeshing spur-gear having a like number of teeth and mounted on the short shaft 80, properly mounted for rotation in the frame member 41.

81 indicates a sprocket carried by the shaft 80 and arranged to drive a chain 82, through which power is transmitted to the devices ultimately to be driven by the power-transmission mechanism. 81' indicates a similar sprocket mounted directly on the shaft 44'.

82' indicates a drive-chain associated with the sprocket 81'.

The operation of the device so constructed is as follows: Assuming that the shaft 19 is running in the direction of the arrow, Fig. 1, and it be desired to rotate the driven shafts 44 and 44' forwardly at their highest speed, the lever 63 is first thrown to its rearmost notch in the segment 64—that is to say, to the opposite limit of its movement from that shown in Fig. 7. In such position the driven disks 45 and 45' will be separated as widely as possible, permitting the driving-disk 23 to be freely moved between their plane confronting faces 49 and 49'. Now the hand-wheel 39 is rotated, imparting movement through its gear and rack connections 35 and 34 to the sliding sleeve 21, carrying the driving gear members. In its new position the wheel is locked by the latch mechanism shown. By the movement described the driving gear members are moved to the positions illustrated in Fig. 1, where the gear member 23 is in proper position for its inclined face 25 to engage the coacting surfaces 46 and 46' of the respective driven gear members. Under the conditions specified, however, operative driving engagement, such as is required when the device is under a load, is not yet effected, as the lost-motion connection of the driven shafts 44 and 44' with their respective carrier-sleeves 51 and 51' prevents them from being held in operative contact with the driving gear member. Now pressure is applied to the foot-lever 77 to rotate the rock-shaft 76, thereby drawing upon the cable connections 74 and effecting a slight simultaneous axial movement of the shafts 44 and 44' inward in their sleeves 51 and 51', respectively, as hereinbefore described. This last movement brings the frictional driving and driven gear members into driving contact, and in such position they are maintained as long as pressure is exerted upon the lever 77 in proper direction. It will be noted that in this contact position the extension of the line of contact of the faces 25 and 46 of gear members 23 and 45 would pass through the point of intersection of the axes of shafts 44 and 19, or, in other words, that said line of contact is the true line of contact for the given position of the driving and driven gear members.

In automobiles and for other purposes it is of course advantageous to effect such true or correct driving connection between the driving and driven gear members at the highest speed to secure the highest efficiency for the power available, and such result obviously follows under the conditions described.

When it is desired to drive the driven mechanism at any speed intermediate its highest speed and its lowest attainable speed, the hand-wheel 39 is operated to move the driving gear member 23 forward radially of the driven disks, and the hand-lever 63 is actuated to bring the driven disks 45 and 45' into approximately proper position for the engagement of the surfaces 49 and 49' of said disks with the surface 26 of the driving gear member. It will be obvious that the disk 23 may be adjusted to any point between the inner and outer circumferences of the surface 49 of the driven disk to so adjust the speed. Under such conditions there is the usual loss of power due to slippage; but as such speeds are adopted only under ordinary working conditions the advantage of infinitesimal adjustability is paramount to the loss of efficiency. When, however, it is desired to proceed at the lowest speed of which the mechanism is capable, it is important to overcome this tendency to slippage, as in automobile use the slow speed is used for hill-climbing and under other conditions requiring the application of the engine's greatest power. In my present device by proper operation of the hand-wheel 39 the driving gear member 23 is shifted to its forwardmost position on the shaft 19, the hand-lever 63 is thrown forward to the position illustrated in Fig. 7, bringing the driven disks to approximately their closest proximity, and the foot-lever 77 is operated as before to effect the driving connection of the parts. Now the driving members are in the position illustrated in Fig. 5, the driving-surface 24 of the smallest diameter provided by the driving member 23 connecting with the surfaces 47 and 47' of the driven disks, with the lines of contact lying in the true contact-lines for such position. Accordingly the slowest speed of rotation is imparted to the driven member; but the highest efficiency of the driving connection is attained and the greatest torque or turning effect is secured. Further movement of the sleeve 21 in a forward direction by the means heretofore described and proper adjustment of the driven gear elements by the means heretofore described effect driving contact between the surface 28 of the gear member 27 and surfaces 47 and 47' of the driven disks. Now motion is transmitted from the driving-shaft to the driven shafts to impart to them rotation in the direction opposite that indicated by the arrows on the respective disks, and consequently the mechanism is backed.

The parts may be further positioned, as illustrated in Fig. 6, to back the machine at any desired speed. As it is not usual in automobile construction to provide means for backing at the highest speed, I have not herein shown the disk 27 as being adapted for the highest speed attainable; but it is obvious that, if preferred, it might be made as an exact duplicate of the gear member 23, and thereby be made susceptible of use to impart the highest speed of rotation in a rearward direction and with highest driving efficiency.

While I have herein described my mechanism as employing two driven disks, it is obvious that its teachings are applicable to a device employing only one driven disk, although I prefer the construction illustrated. It is noteworthy, however, that where the two disks are employed, as herein illustrated, the form of connection illustrated employing a common cable connection 74 provides means for compensating for any slight misplacement of the driven elements relative to the driving member or any distortion of either of said parts from their true positions. I have also herein described an arrangement whereby the operative movement of the driven disks is partially effected by one set of instrumentalities and completed by another; but while I consider this refinement to be of value and advantage I do not desire to be limited thereto, as it is obvious that the lost-motion connection between the driven shafts and their primary moving devices might be dispensed with and the entire movement of the disks effected solely through the cam mechanism or an equivalent means alone.

While I have herein described one embodiment of my invention with some particularity for the purpose of full disclosure of the invention, I do not desire to be limited to the specific devices so illustratively employed, as it will be apparent to those skilled in the art that many changes might be made in the embodiment of my invention without departing from the spirit and scope thereof.

Having described my invention, what I claim, and desire to secure by Letters Patent of the United States, is—

1. In a device of the character described, a friction disk member having an inclined working surface near its periphery, an inclined working surface near its center, and a flat intermediate surface approximately at right angles to its axis, a friction wheel member provided with three surfaces disposed for coaction with said surfaces of the disk member, and means for varying the relative positions of said members to bring selected complementary surfaces of the two members into driving engagement.

2. In a device of the character described, a friction disk member having a working surface at substantially right angles to its axis, and an inclined working surface at greater radial distance from said axis than the first-mentioned surface, a friction wheel member provided with a surface substantially parallel to its axis, and an inclined working surface adapted to coact with the complementary inclined working surface of the disk member, and means for varying the relative positions of said members to bring the complementary surfaces thereof into contact.

3. In a device of the character described, a friction disk member having a flat working face at right angles to its axis, an inclined working surface at a greater radial distance from said axis than the flat face, and another inclined working surface at a less radial distance from its axis than said flat face, a friction wheel member comprising a surface parallel to its axis, and two inclined surfaces adapted for coaction respectively with the flat face and the inclined surfaces of the disk member, the inclined surfaces of the wheel being arranged at different radial distances from its axis less than the distance of the parallel surface therefrom, and means for varying the relative positions of the members to bring the complementary surfaces into operative engagement.

4. In a device of the character described, the combination of a driving gear member, a driven gear member, means for moving one of said members relative to the other in a direction to produce driving contact of one gear member with the other, and another means for further moving said movable gear member to establish and maintain contact relation between the said gear members.

5. In a device of the character described, a driving-shaft, two driving gear members thereon, two driven shafts on opposite sides of the driving-shaft, two driven gear members carried by the respective driven shafts, means for relatively moving said gear members in directions to produce operative coaction of the driving gear members each with one of the driven gear members, and means for effecting another relative movement between the gear members moved toward position of coaction, to simultaneously establish operative contact between such gear members.

6. In a device of the character described, the combination of a driving gear member and a driven gear member, one of said gear members having a plurality of peripheral working surfaces arranged at various radial distances from its axis and adapted to coact with corresponding face-surfaces of the other gear member, means for moving one of said gear members to approximately the position for contact with a selected surface of the coacting gear member, and other means for slightly moving the first said gear member relative to said approximate position, to finally establish its contact with the coacting gear member.

7. In a device of the character described the combination of a driving-shaft, a driven shaft at right angles thereto, a driving gear member carried by the driving-shaft and having peripheral surfaces at various radial distances from the axis thereof, a coacting driven gear member carried by the driven shaft, means for effecting relative movement of said gear members both radially and axially of the driven gear member to approximately position them for contact, and independent means for further moving one of said gear members to complete the contact.

8. In a power-transmitting device, a movable gear member, and a shaft therefor, a sleeve surrounding said shaft and provided with a transverse slot, a relatively stationary frame wherein said sleeve is slidably but non-rotatively adjustable, a pivoted segmental cam provided with a guiding-blade engaging the slot in the frame member and a cam-blade engaging the slot in the sliding sleeve, and means for turning said segmental cam member about its pivot.

9. In a device of the character described a movable gear member mounted for axial movement relative to a frame, a slot being provided in a part moving therewith, the relatively stationary frame having a slot therein, and an actuating cam member provided with a guiding-blade arranged in engagement with the slot in the frame, and a cam-blade arranged in engagement with the slot in the part associated with the gear member, and means for reciprocating said cam member in engagement with said slots.

10. In a device of the character described, a pair of confronting gear members adapted to be axially moved and means for simultaneously moving said gear members in opposite directions including moving elements associated with the individual gears, and a pressure-equalizing connection between said moving elements.

In testimony that I claim the foregoing as my own I affix my signature in presence of two witnesses.

WILLIAM F. HOWE.

In presence of—
GEORGE T. MAY, Jr.,
MARY F. ALLEN.